United States Patent [19]
Crandall et al.

[11] 4,305,821
[45] Dec. 15, 1981

[54] DOCTOR BLADE LIFTER OVER BELT SEAM

[75] Inventors: Robert E. Crandall, Greendale; Bert Krivec, Waukesha, both of Wis.

[73] Assignee: Envirex Inc., Waukesha, Wis.

[21] Appl. No.: 215,588

[22] Filed: Dec. 11, 1980

[51] Int. Cl.³ ............................................ B01D 33/34
[52] U.S. Cl. .................................... 210/396; 210/400
[58] Field of Search .............. 210/396, 397, 400, 401, 210/DIG. 3

[56] References Cited

U.S. PATENT DOCUMENTS

| | | | |
|---|---|---|---|
| 2,076,611 | 4/1937 | Barnebl | 210/396 |
| 2,669,360 | 2/1954 | Little | 210/396 |
| 4,146,484 | 3/1979 | Campbell | 210/396 |

*Primary Examiner*—John Adee

[57] ABSTRACT

A hinged doctor blade is biased to its operative position respecting the belt of a belt conveyor. Shoes at each end of the blade ride on the belt ahead of the blade respecting belt travel and are positioned and connected to the blade so that the forward clips of the belt joint lifts the blade upon the first approach of either end of the joint and the other end is effective to hold the doctor blade in its raised position until the forward portion of the seam is beneath the blade and the blade can safely ride over the seam and then resume its operative position respecting the filter belt. Adjustment means are provided so that the positions of the shoes relative to the doctor blade may be set as required by the length of the seam having reference to the direction of belt travel.

5 Claims, 5 Drawing Figures

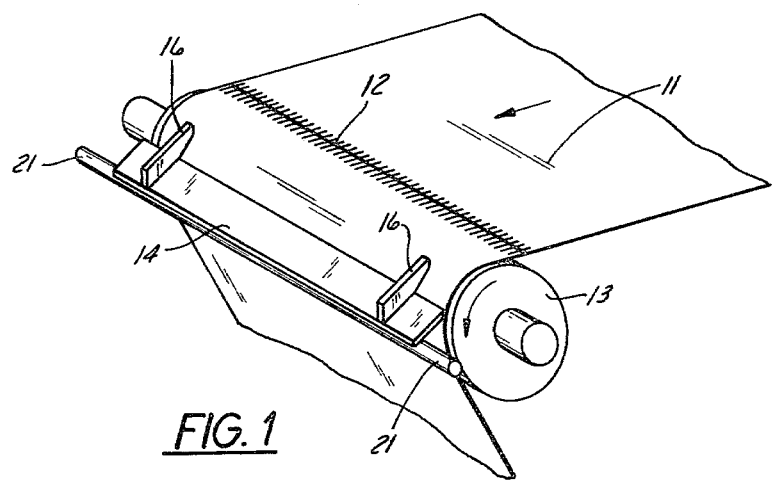
FIG. 1
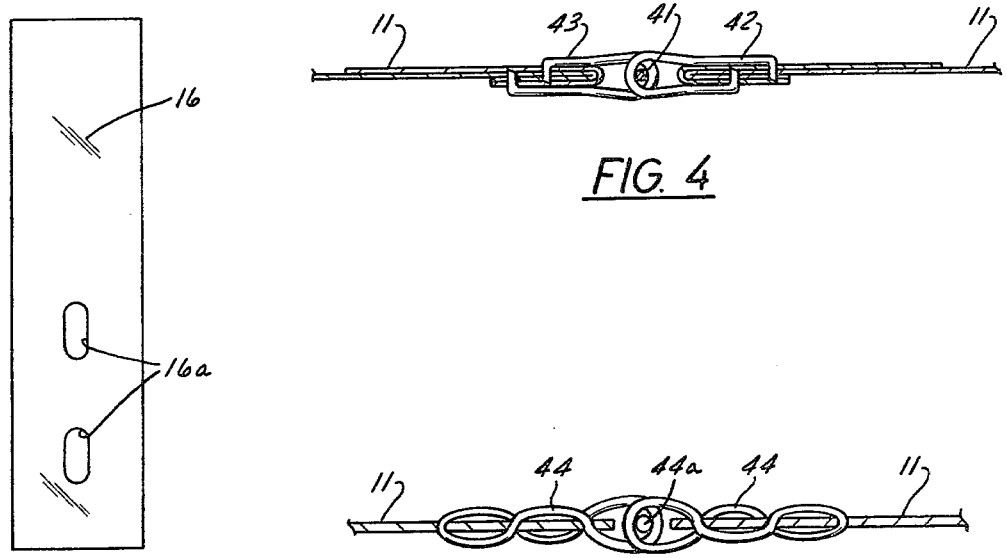
FIG. 3
FIG. 4
FIG. 5

DOCTOR BLADE LIFTER OVER BELT SEAM

BACKGROUND OF THE INVENTION

Endless belt conveyors which are used to convey bulk materials on the belt generally discharge the material as the belt moves over the head pulley of the conveyor.

The endless belt, except in very small sizes, comprises a length of belting having its ends spliced or seamed. The belting used in a belt filter is of a porous weave which cannot practicably be spliced and requires a well designed seam because of the relatively fragile nature of the belting and the considerable belt tension which is required for the operation of the filter press. A hinged joint is required because of the small radius of the many rolls over which the belt travels in a belt filter.

The typical hinged belt joint includes two series of clips and a connecting hinge pin or hinge wire. The clips and the pin extend the width of the belt and each clip essentially comprises a staple which grasps the adjacent end portions of the belting. The staples may be clinched for additional security. The clips must securely grasp the adjacent ends of the belting which are of a multiple thickness for added strength. For reference purposes, one clip extends forwardly having reference to the direction of belt travel. In another type of seam, a series of loops is sewn in each of the two adjoining ends of the belting so that a stiff wire or plastic pin may be passed through the loops to form the joint.

The materials to be belt filtered particularly tend to stick to the belt and require their removal with a doctor blade which is held against or immediately adjacent to the carrying surface of the belt so that the material is fully removed with a minimum of residue.

Preferably such a doctor blade comprises a flat, rigid bar having a bevelled edge. The doctor blade is pivotally mounted and spring biased so that its bevelled edge is held in contact with the belt where it is firmly supported by a roll. The blade is preferably of a non-metallic material so that its contact with the belt will not damage the belt.

A considerable difficulty in the operation of the filter belt has been due to the damaging effect of the belt seam on the doctor blade as it approaches and lifts and then passes under the blade. Additionally, if some part of either clip is projecting it often catches on the doctor blade such that both the blade and the belt are damaged and require repair.

The object of the present invention is to prevent such damage to the doctor blade and to the belt and clips by providing reliable means for lifting the doctor blade at least over the forward portion of the seam. In particular such means should operate irrespective of whether the belt seam has remained normal or straight across the belt or has become skewed, as is usual to some degree.

SUMMARY OF THE INVENTION

A hinged doctor blade is biased to its operative position respecting the belt of a belt conveyor. Shoes at each end of the blade ride on the belt ahead of the blade respecting belt travel and are positioned and connected to the blade so that the forward clips of the belt joint lift the blade upon the first approach of either end of the joint and the other end is effective to hold the doctor blade in its raised position until the forward portion of the seam is beneath the blade and the blade can safely ride over the seam and then resume its operative position respecting the filter belt. Adjustment means are provided so that the positions of the shoes relative to the doctor blade may be set as required by the length of the seam having reference to the direction of belt travel.

DESCRIPTION OF THE DRAWING FIGURES

FIG. 1 is a perspective view of the discharge portion of a belt filter.

FIG. 2 is an enlarged end view of the discharge roll and doctor blade shown in FIG. 1. One of two shoes is shown riding over the belt joint to lift the doctor blade. The leaf spring normally biasing the doctor blade in contact with the belt is also shown.

FIG. 3 is a plan view of one of the shoes and shows the slots for the bolts allowing some adjustment of the shoes relative to the doctor blade.

FIGS. 4 and 5 are enlarged end views of typical belt seams for joining the two ends of the belting.

DESCRIPTION OF THE PREFERRED EMBODIMENT

Figure 2:
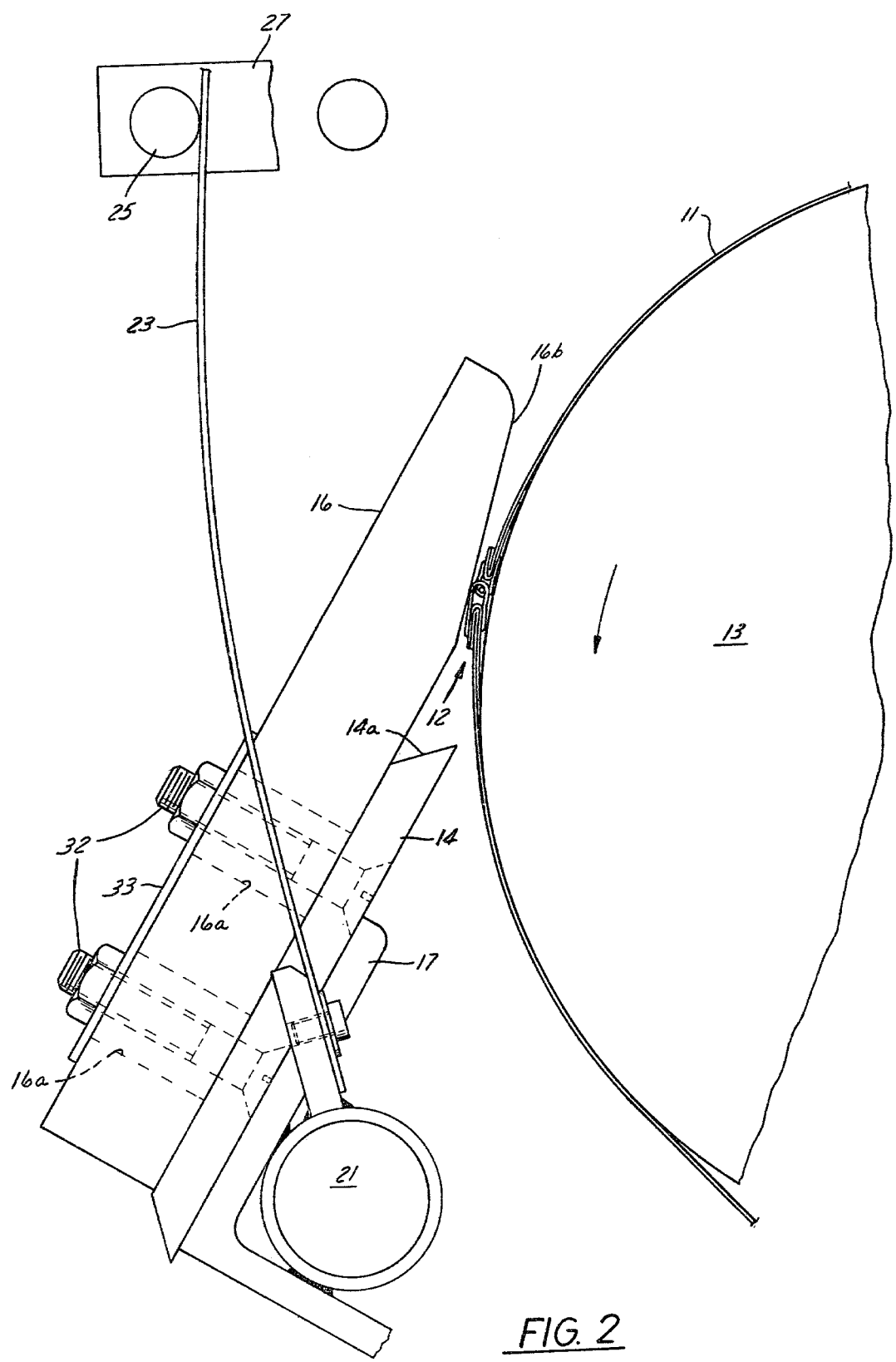

As shown in FIG. 1, the belt 11 which includes the seam 12, passes over the roll 13 and moves downwardly therefrom. The material on belt 11 as it reaches the roll 13 is removed by the doctor blade 14 which extends the full width of belt 11. A shoe 16 is attached to each end of doctor blade 14.

As shown in FIG. 2, doctor blade 14 is bevelled as at 14a and the blade is reversible and is attached along its length to the supporting angle iron 17.

Pins, including pin 21, project from the ends of angle iron 17 and are journalled in bearings, not shown, carried by the frame of the belt press for the pivotal support of the doctor blade.

The leaf spring 23 (not shown in FIG. 1) is attached at one end to the pin 21. The other end bears against the stationary pin 25 projecting from the member 27 which is a part of the belt press frame, not otherwise shown.

According to the present invention, the shoes 16 comprising solid plastic blocks having tapered ends as shown, are secured to the doctor blade and project therefrom so as to be engaged by the belt seam before the latter reaches the blade.

More particularly, the body of each shoe 16 is of generally rectangular section and is provided with the two slots 16a for the bolts 32. The flat headed bolts 32 and the plate 33 secure the shoe to the blade and the slots allow the shoe to be adjusted endwise within limits relative to the blade and its pivot axis.

The extended plane of the bearing surface 16b of the shoe approximately includes the pivot axis of the doctor blade, that is of the pins including pin 21, and each shoe 16 is adjusted so that the bevelled edge of blade 14 may be normally held against belt 11 by the spring 23, but with a minimum of clearance between the belt and cam surface 16b of the shoe.

With such adjustment, the seam 12 in engaging the shoes 16 is effective to lift the doctor blade from the belt and hold the blade a distance away from the belt at least so that and until the forward portion of the seam is between the doctor blade and the roll.

With further belt movement, and as the shoe 16 rides over the seam, the doctor blade is relowered onto the seam 12 which may continue movement with roll 13 without damage to the blade or to the seam.

Invariably, or normally in operation, one end of seam 12 becomes and remains slightly advanced respecting the other end, such that the seam is at least slightly and often considerably skewed. The present invention functions equally well irrespective of such skewing.

In any such case, the shoe 16 which is first engaged by the seam, lifts the blade as described and the blade is then lowered onto seam 12 nearer one end. The seam then passes under the blade at an angle. The other shoe, which is engaged by the trailing end of the seam, of course, relifts the blade slightly and then lowers it gently onto the belt.

While the shoe which first lifts the blade is functionally indispensable, the second which gently relowers the blade onto the belt is also an essential element of the present invention. The rigidity of the angle iron 17 or any other means which assures that movement of either shoe will effect the same movement of the other shoe and the doctor blade generally is also essential.

FIG. 4 is an end view of a typical hinged fastener which forms the seam 12. The hinge wire 41 joins the two clips 42 and 43 having the projecting staples. When the clips are closed onto the belt, the staples project into the adjoining ends of the belt for securement. The adjoining ends are doubled as shown and include an additional strip of the belting for added strength.

FIG. 5 shows a seam which comprises a series of sewn loops 44 extending from the ends of the belt and around the hinge pin 41a.

In some embodiments of the invention the belt may be supported by a fixed plate over which the belt slides. The pulley or plate is necessary to hold the belt in a given position relative to the doctor blade. The invention requires that the seam have a thickness greater than the belt, such as twice as thick. The length of the seam which is measured in the direction of belt travel determines the required spacing of the cam shoes from the edge of the blade.

We claim:

1. In a belt filter press having an endless belt, a pulley over which the belt passes and a doctor blade extending across the belt oppositely of the pulley and disposed to remove the dewatered solids from the belt as the belt passes between the blade and the pulley, said belt comprising a length of belting of porous material and a seam joining the opposite ends of the belting and extending squarely across the belt, the thickness of said seam being substantially greater than that of the belt, means supporting and normally holding the doctor blade in a first position against the belt and yieldably allowing the doctor blade limited movement toward a second position away from the belt, and a shoe secured in fixed relation to each end of said blade and having a cam surface which is engageable by the belt seam as the seam approaches the doctor blade such that the seam lifts the doctor blade from the belt and holds the doctor blade away from the seam at least until a portion of the seam is beneath the blade.

2. In a belt filter press including an endless belt, having a seam extending directly across the belt, said seam being of a thickness of at least twice that of the belt and a given length having reference to the direction of belt travel, a pulley over which the belt passes, and a doctor blade extending across the belt oppositely of the pulley and parallel thereto, said doctor blade having means supporting and normally holding the blade in a first position directly adjacent to the belt for the removal of the dewatered solids from the belt as it passes between the blade and the pulley and yieldably allowing the blade to be moved toward a second position away from the belt and to return the blade to said first position, and a shoe held in fixed relation to each end of said doctor blade and having a cam surface directly in the path of a portion of the belt seam such that the seam upon engaging either shoe is effective to move the blade toward said second position before any part of the seam reaches the doctor blade and is further effective to hold the blade in said second position at least until some portion of the seam is between the blade and the pulley.

3. In a belt filter press having a porous belt, a belt support over which the belt travels and a doctor blade normally disposed in a first position with its operated edges a selected distance from the support and to remove the solids from the belt as the belt moves between the support and the doctor blade, said belt having a construction which requires a seam of a thickness substantially greater than said distance between the support and the blade; means for lifting the blade from the path of the seam as the seam approaches the doctor blade and before the seam has engaged the doctor blade, said means comprising a bearing means supporting the doctor blade allowing movement of the blade from said first position and in the direction away from the belt and means biasing said doctor blade toward said first position, and a shoe held in fixed relation to the doctor blade at each end thereof and having a cam surface directly in the path of a portion the belt seam at each side of the belt such that whichever shoe is first engaged by a portion of the seam is effective to move the blade in said direction and to a second position and to hold the blade in said second position at least until said portion of the seam is between the blade and the support.

4. The invention of claim 3 wherein the shoes are adjustable relative to the edge of the doctor blade so that both shoes are identically functional.

5. The invention of claim 3 wherein the doctor blade is of a thermoplastic material and is removably attached to a rigid member which is supported by said bearing means.

* * * * *